United States Patent
Bold (10) Patent No.: US 7,819,360 B2
(45) Date of Patent: Oct. 26, 2010

(54) WINDOW FRAME FOR AIRCRAFT (75) Inventor: Jens Bold, Hamburg (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/597,115

(22) PCT Filed: May 24, 2005

(86) PCT No.: PCT/EP2005/005604

§ 371 (c)(1),
(2), (4) Date: Dec. 28, 2007

(87) PCT Pub. No.: WO2005/115838

PCT Pub. Date: Dec. 8, 2005

(65) Prior Publication Data

US 2008/0191095 A1    Aug. 14, 2008

Related U.S. Application Data (60) Provisional application No. 60/600,104, filed on Aug. 9, 2004.

Foreign Application Priority Data

May 24, 2004    (DE)    ........................ 10 2004 025 378

(51) Int. Cl.
    B64C 1/14    (2006.01)
    B32B 5/08    (2006.01)
(52) U.S. Cl. .................................... 244/129.3; 428/107
(58) Field of Classification Search ............. 244/129.3, 244/129.1, 121; 52/171.1, 204.1, 204.5; 428/107
See application file for complete search history.

(56) References Cited

U.S. PATENT DOCUMENTS

| 5,024,399 | A |   | 6/1991  | Barquet et al. |
|-----------|---|---|---------|----------------|
| 5,271,581 | A | * | 12/1993 | Irish ........................ 244/129.3 |
| 5,452,867 | A |   | 9/1995  | Grunwald et al. |
| 5,496,602 | A | * | 3/1996  | Wai ........................... 428/40.4 |

(Continued)

FOREIGN PATENT DOCUMENTS

DE    689 04 601 T2    6/1989

(Continued)

Primary Examiner—Tien Dinh
Assistant Examiner—Richard R Green
(74) Attorney, Agent, or Firm—Lerner, David, Littenberg, Krumholz & Mentlik, LLP (57) ABSTRACT A window frame (1) for installation in the exterior shell of an aircraft comprises in each case at least one outer flange (2), one inner flange (3), and one vertical flange (4) arranged perpendicular to and between these flanges (2, 3), wherein the connection with the aircraft structure (5) is realized via the outer flange (2) and wherein on the inner flange (3), a window element (7, 8) to be held is attached, which is held via the vertical flange (4). The window frame (1) comprises resin reinforced with unidirectionally arranged fiber bundles (20), wherein the progression of the fiber bundles in the three regions of the outer flange (2), inner flange (3), and vertical flange (4), respectively, follow the mechanical load direction. For manufacturing, a semifinished part made from unidirectionally arranged fiber bundles is inserted into a molding tool (11), in which, under pressure and temperature, resin is injected, and the component made in this manner is hardened subsequently in the molding tool (11).

4 Claims, 6 Drawing Sheets

U.S. PATENT DOCUMENTS

| | | |
|---|---|---|
| 2003/0168775 A1 | 9/2003 | Eberth et al. |
| 2005/0042410 A1* | 2/2005 | Sakonjo et al. ............. 428/66.6 |
| 2006/0169396 A1* | 8/2006 | Joern ......................... 156/166 |

FOREIGN PATENT DOCUMENTS

| | | |
|---|---|---|
| DE | 42 34 038 | 4/1994 |
| DE | 102 51 579 A1 | 9/2003 |
| EP | 0 089 337 B1 | 9/1983 |
| EP | 1 342 553 A1 | 9/2003 |
| WO | WO-83/01237 A1 | 4/1983 |
| WO | WO 02098651 A1 * | 12/2002 |
| WO | WO-03/103933 | 12/2003 |
| WO | WO-2004/016844 A1 | 2/2004 |

* cited by examiner

WINDOW FRAME FOR AIRCRAFT

This application claims the benefit of the filing date of U.S. Provisional Patent Application No. [60/600,104] filed Aug. 9, 2004 and of the German Patent Application No. 10 2004 025 378.1 filed May 24, 2004, the disclosure of which is hereby incorporated herein by reference.

The invention relates to a window frame for installation in the exterior shell of an aircraft, comprising in each case at least one outer flange, one inner flange, and one vertical flange arranged perpendicular to and between these flanges, wherein the connection with the aircraft structure takes place via the outer flange, and wherein on the inner flange, a window element to be held is attached, which is held via the vertical flange. Further, the invention relates to a method for manufacturing such a window frame.

In most of the passenger aircraft manufactured and in operation today, window frames made of aluminum are used, which comprise a part which is made by forging and truing. The component is organized into a total of three regions: an outer flange, an inner flange, and a vertical flange arranged perpendicular to and between these two flanges. The window frames are typically connected with two rows of rivets over the outer flange with the aircraft structure or with the exterior shell of the aircraft. A window element rests on the inner flange, which typically comprises two panes and a sealing arranged therebetween and which is held in its position via a downholder, which is connected with the vertical flange.

In addition to fixing the window element, such a window frame also has the function of absorbing the strain increase, which occurs on the edge of the comparably large cut-out for the window mounted in the load-transferring exterior shell. The outer flange of the window frame thereby serves, on the one hand, for reinforcement of this cut-out and on the other hand, via the outer flange, the frame and the exterior shell are connected to one another by means of rivets. Since the manufacture of the known aluminum window frame typically takes place by means of forging, it is not possible to achieve a cross-sectional distribution of the frame profile that is favorable for the rivet force distribution, since the slant of the flange may amount to a maximum of approximately two angular degrees, in order to enable a simple riveting.

The inner flange serves to receive the window element, wherein here a slanting simplifies the mounting of the window. Simultaneously, the load resulting from the interior pressure, which prevails in the passenger cabin, is transferred via this inner flange to the exterior shell of the aircraft.

The vertical flange serves exclusively as a reinforcement rib on the frame, in order to minimize the tension in the exterior shell with the least possible weight. On this vertical flange, also the eye bolts are attached, with which, typically, the downholder or retainer for the window elements are held in their position. Simultaneously, the vertical flange also forms the guide upon mounting of the window element.

An object of the invention is to provide a window frame of the above-described type, which makes possible a considerable weight savings compared to the window frames used today for this application. Simultaneously, the costs for the manufacture of such a window frame should be as low as possible. In addition, by means of the invention, a simple and cost-effectively performed method of manufacturing such a window frame should be provided.

The invention solves the first object, in that it contemplates that such a window frame comprises a resin reinforced by unidirectionally arranged fiber bundles. The solution of the further object is realized by means of a method, in which a semifinished part made from unidirectionally arranged fiber bundles is inserted into a molding tool, in which resin is injected under pressure and temperature, and with which the component developed in this manner is subsequently hardened in the molding tool.

Because the invention contemplates the use of a window frame manufactured in a fiber composition construction with a load-conform fiber arrangement, in which the fibers follow the load direction, and which, compared to the aluminum window frames used up to now, achieves weight savings of approximately 50 percent. Due to its layer structure optimized according to the invention, the window frame according to the invention has another weight advantage of approximately 20 percent at the same time relative to the fiber window frames, which are made from a semifinished part with quasi-isotropic layer structure. In spite of this great weight savings potential, the costs for such a component, compared to a window frame manufactured from an aluminum forged part, do not rise.

Simultaneously, it is possible to make the fiber window frame according to the invention with a tolerance of only approximately 0.2 mm with an average wall thickness of 5 mm, which corresponds to a manufacturing tolerance of approximately 4 percent. With aluminum forged frames, in contrast, depending on the manufacturing method, tolerances of approximately 1.5 mm are accepted, which corresponds to a manufacturing tolerance of approximately 30 percent with the same will thickness. Therefore, by means of the invention, not only the weight fluctuations between the individual window frames is substantially reduced, but also, simultaneously, the installation of the frame in an aircraft or the mounting of the window element in the frame is simplified considerably. Finally, further advantages are increased safety as well as a greatly improved thermal insulation of the window frame according to the invention.

Next, the invention will be described in greater detail with reference to one embodiment shown in the accompanying figures. In the figures:

FIGS. 5 and 6 show a representation of the main directions with a window frame of FIG. 1, wherein FIG. 6 is a detail representation of the region in FIG. 5 designated with VI;

Figure 1:
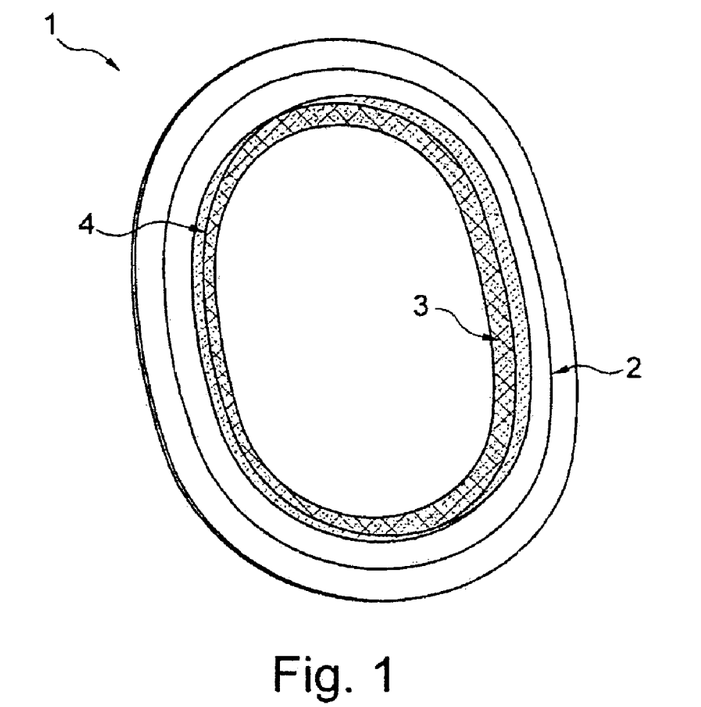
FIG. 1 shows a window frame in perspective view.
Figure 2:
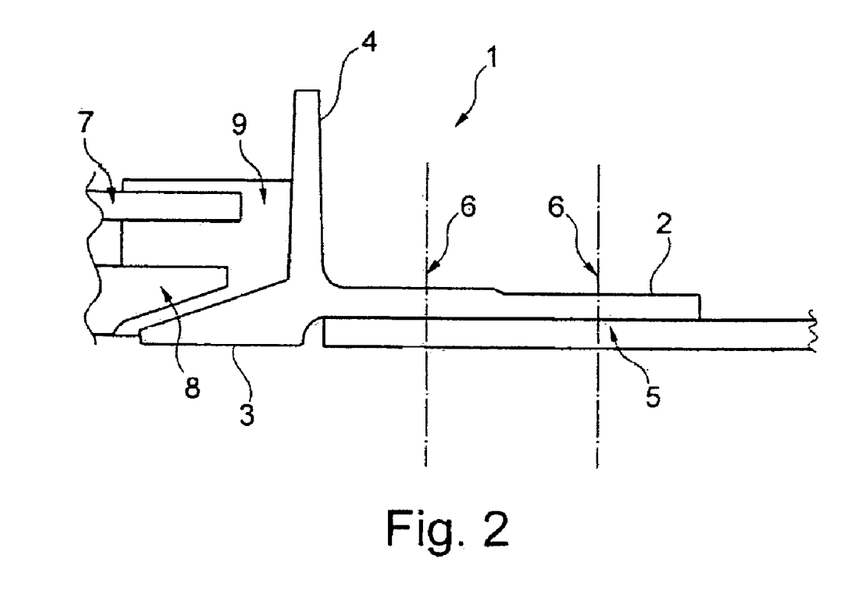
FIG. 2 shows a detail section through the installation position of a window frame according to FIG. 1.

The window frame 1 shown in FIG. 1 is made with a fiber construction and, like the known aluminum forged frames, also has an outer flange 2, an inner flange 3, as well as a vertical flange 4 arranged between these two flanges. In contrast to common aluminum window frames, the outer flange 2 in this case, however, has a uniform circumferential edge. In addition, this outer flange 2, in contrast to a corresponding aluminum forged part has a varying thickness in different radial regions. This leads to a substantially improved material utilization in the region of the riveting and the shell cut-out. FIG. 2 more clearly shows this in a detail section, in which the installation position of such a window frame 1 in the outer shell 5 of an aircraft is shown. Indicated in this figure are also the rivet positions 6 for the connection of the frame with the outer shell 5, as well as two window panes 7 and 8, which together with a sealing 9, form the window element.

Figure 3:
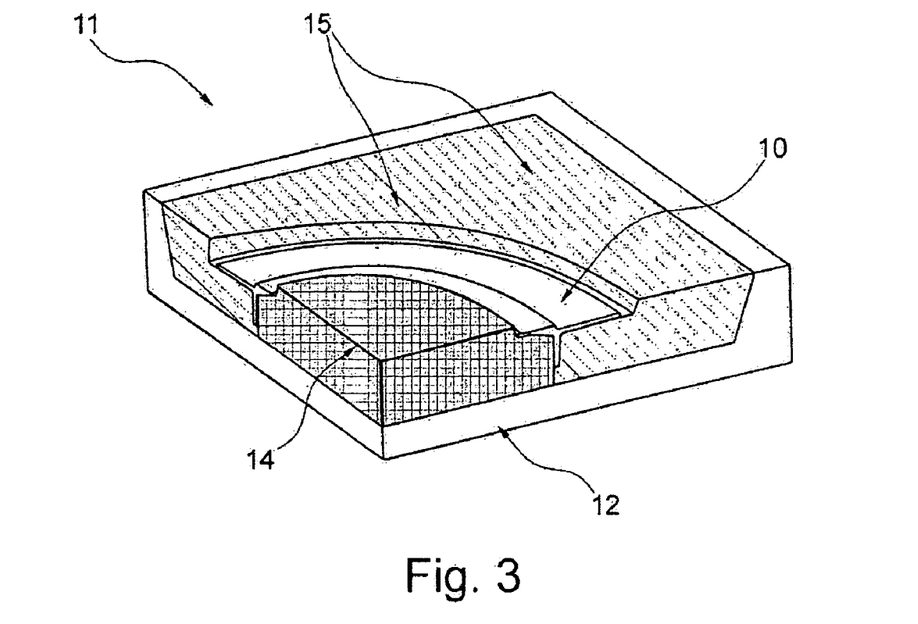
FIG. 3 shows a part of a molding tool for manufacturing a window frame of FIG. 1 in an opened position.
Figure 4:
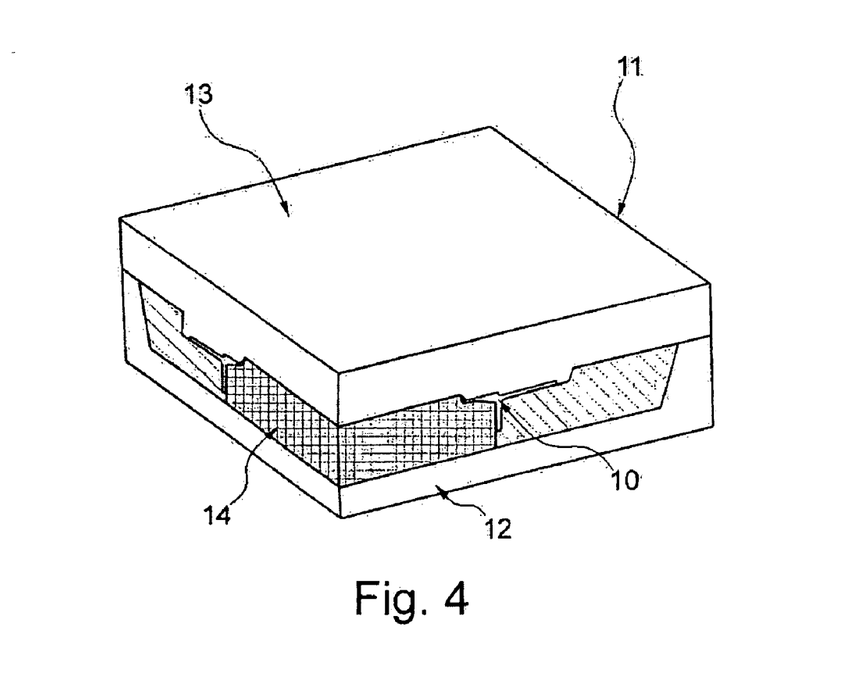
FIG. 4 shows the molding tool of FIG. 3 in a closed position.

The window frame 1 is manufactured by means of the so-called "resin-transfer-molding" or RTM technology. In this connection, first a mold part 10, the so-called preform, is manufactured from fibers. This is next placed in a two-part molding tool 11, as shown in FIGS. 3 and 4. Within a lower molding tool 12 and an upper molding tool 13, an inner core 14 and an outer core 15, in this case formed in two parts, are arranged. The preform 10 is inserted between the two cores 14 and 15, the molding tool 11 is closed, and under pressure and temperature, resin is injected into the molding tool. The complete component 1 subsequently is hardened within the molding tool 11. The preform 10 can either be manufactured as a complete part or in the so-called sub-preform technology, in which the complete window frame 1 is combined from individual substructure-elements or sub-preforms.

Figure 5:
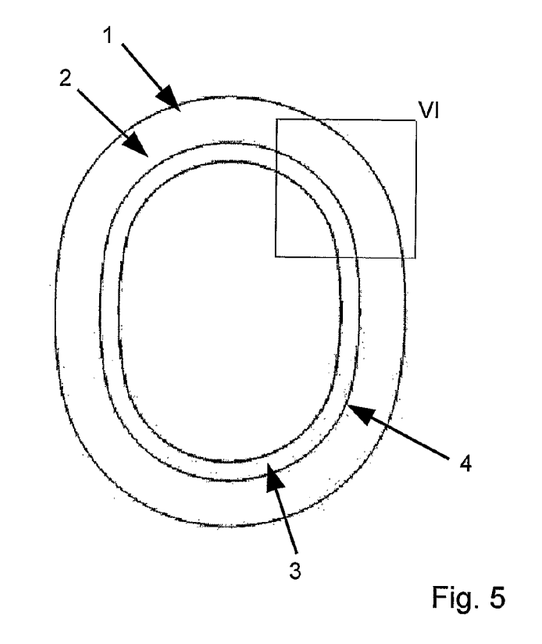
Figure 6:
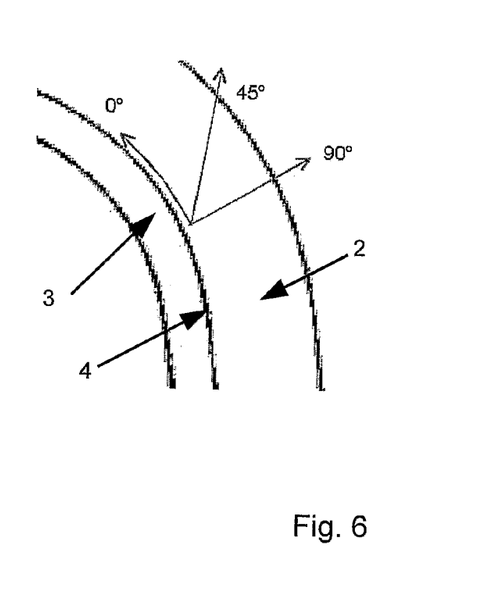

In each case, the preform 10 comprises individual layers, which are structured from unidirectional, circumferential fiber bundles. The direction of the individual fiber layers or positions is critical for the weight savings achievable with the window frame 1 described here. A fiber direction, which is not circumferential in the frame, could not achieve the weight savings that are achieved with the arrangement described herein. The principle layer direction with the main directions 0°, 45°, and 90° are shown in FIGS. 5 and 6. The 0° direction therefore represents the circumferential direction of the window frame 1, the 90° direction runs in the radial direction, and the 45° direction runs in the region of the transition from the vertical flange 4 to the outer flange 2.

Figure 7:
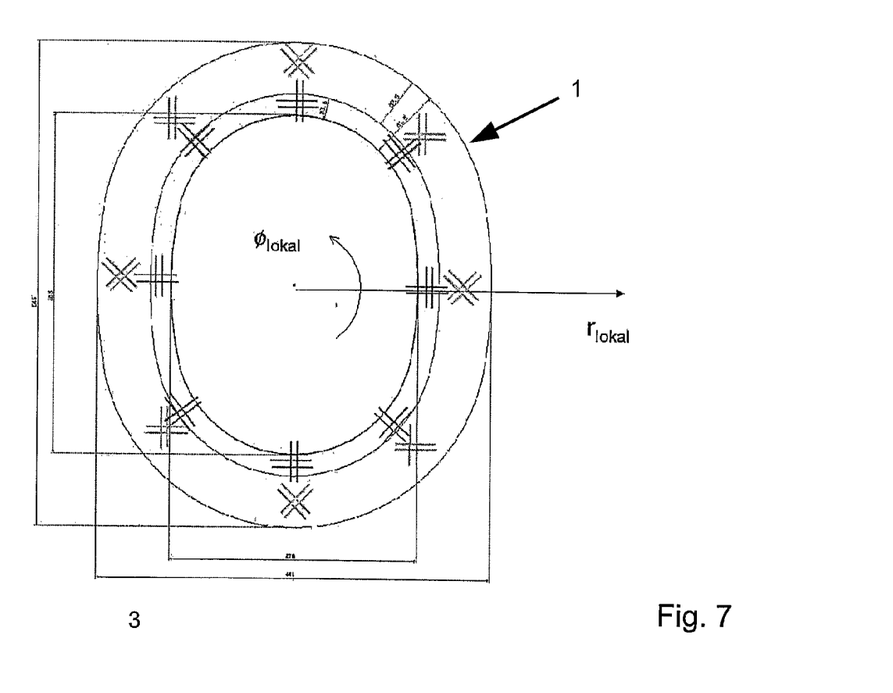
FIG. 7 shows the direction of a load-suitable layer structure of the window frame of FIG. 1 in a principle representation.
Figure 8:
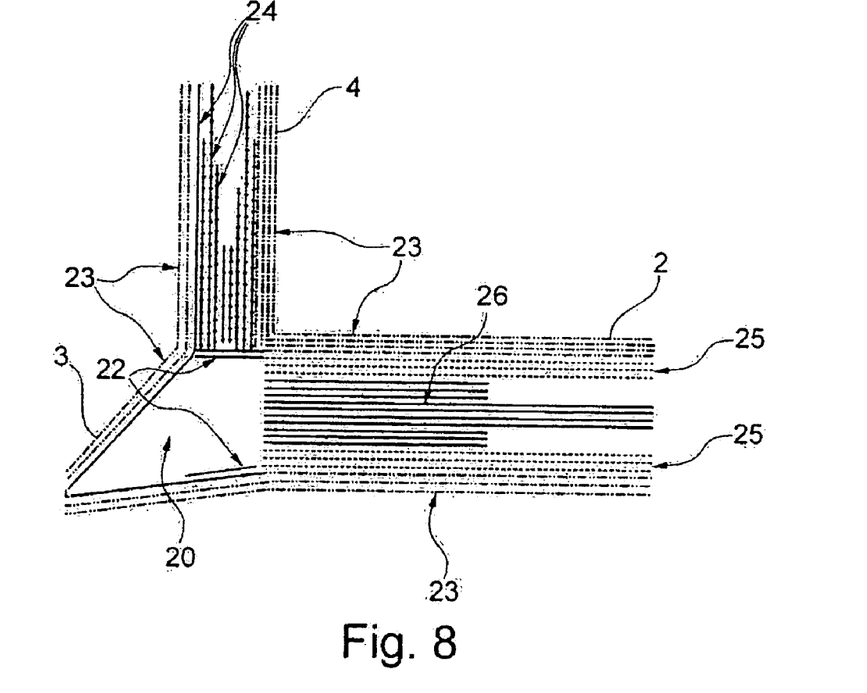
FIG. 8 shows the structure of a preform in a sectional view.
Figure 9:
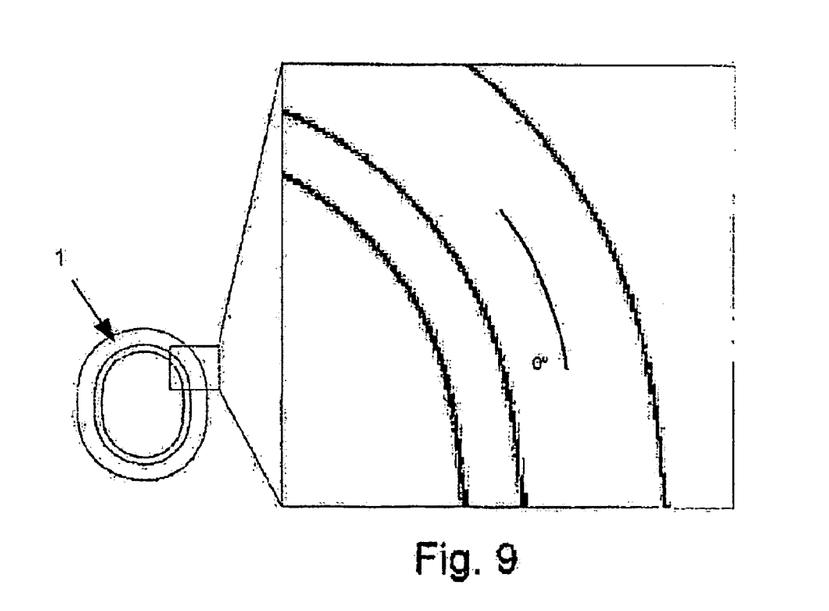
FIGS. 9-12 show the fiber progression in different regions of the window frame of FIG. 1.
Figure 10:
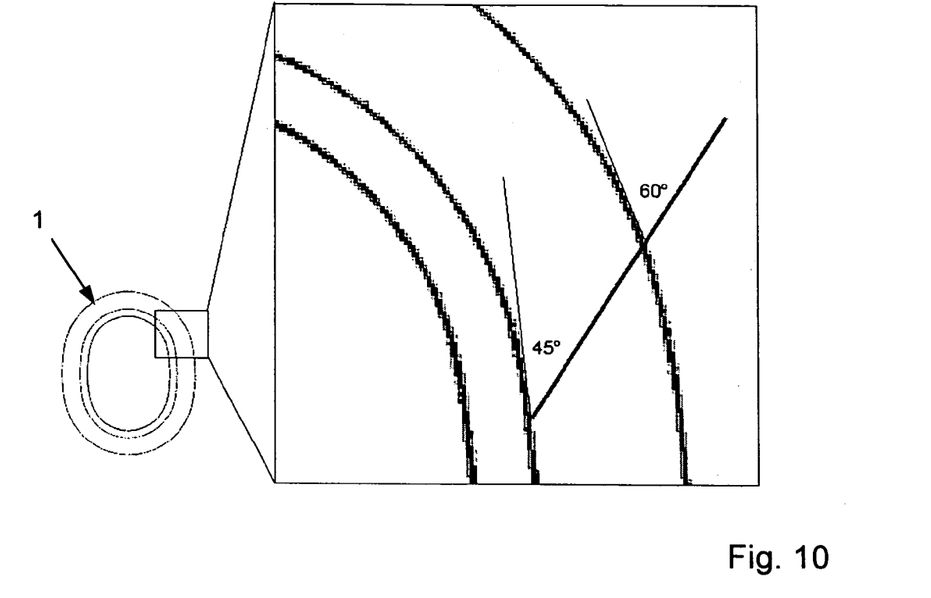
Figure 11:
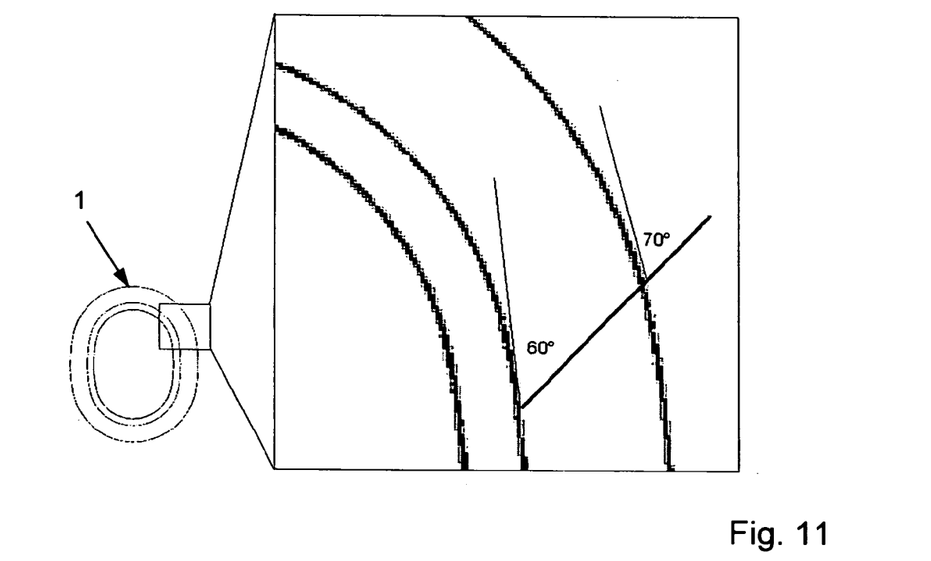

The fiber progression is detailed in FIGS. 7 through 12. First, FIG. 7 shows in principle representation the directions of a load-suitable layer structure of the window frame 1 and FIG. 8 shows a section through the layer structure of the fiber bundle. In this figure, reference numeral 20 designates the 0° winding core in the inner flange, reference numeral 23 designates the fiber bundles with a ±60° arrangement in all outer regions as well as the ±60° arrangements in all outer regions extending from the outer flange 2 to the inner flange 3, reference numeral 24 designates the fiber bundles with 0° and 90° arrangements in the region of the vertical flange 4, and 25 designates the fiber bundles with ±45° arrangements in the region of the outer flange 2. These layer directions are measured on the interface of the outer flange 2, inner flange 3, and vertical flange 4. In order to achieve a fiber progression, in which the fibers follow the load direction, a structuring is selected for the window frame 2, which is summarized as follows:

Outer flange 2:
  Quasi-isotropic, radial structure (26) in the region of the riveting;
Vertical flange 4:
  0° core for receiving the main load;
  ±60° layers on the outer sides.
Inner flange 3:
  0° direction predominantly;
  ±60° layers on the outer sides;
  90° for reinforcement (22);

As can be seen from FIGS. 9 through 12, in which, respectively, the cut-out of the window frame 1 shown in the left part of the figure is enlarged, the following details are provided for the respectively straight-laid fiber:

Vertical flange 4:
  All fibers remain in the direction, in which they were measured;

Inner flange 3 and outer flange 2:
  0° fibers remain in the direction, in which they were measured (FIG. 9);
  ±45° fibers change their angle to ±60° (FIG. 10);
  ±60° fibers change their angle to ±70° (FIG. 11).

Figure 12:
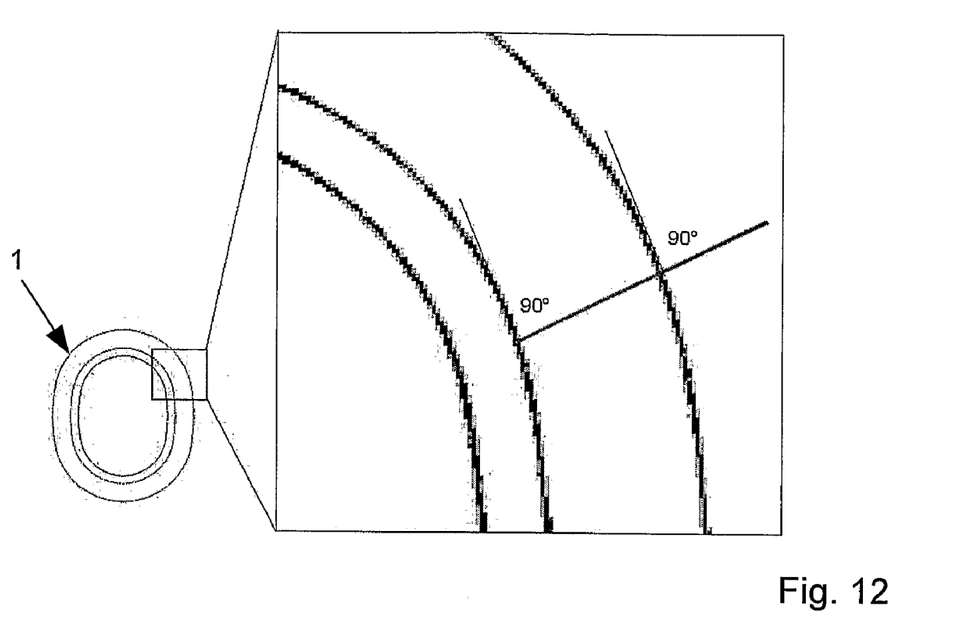

Finally, FIG. 12 shows the 90° fiber in the radius direction. Altogether, a quasi-isotropic radial straight structure is provided, in which the fibers always run in the load direction and are straight.

The window frame 1 made in this manner has an approximately 50 percent weight savings with approximately the same manufacturing costs compared to the common aluminum window frames. Its tolerances are essentially lower than the tolerances of the corresponding aluminum components. Simultaneously, the frame offers higher safety and better thermal insulation than the common aluminum window frame.

The invention claimed is:

1. A window frame for installation in the exterior shell of an aircraft, comprising:
   at least one outer flange having different thicknesses in respective radial areas;
   at least one inner flange; and
   at least one vertical flange arranged perpendicular to and between the at least one outer flange and the at least one inner flange;
   wherein the at least one outer flange includes an inner boundary located at the intersection between the at least one outer flange and the at least one vertical flange and an outer boundary located at a radially outward edge of the at least one outer flange;
   wherein a connection with the aircraft structure is realized via the at least one outer flange;
   wherein on the at least one inner flange, a window element to be held is attached, which is held via the at least one vertical flange;
   wherein the window frame comprises a resin reinforced with unidirectionally arranged fiber bundles; and
   wherein the unidirectional arranged fiber bundles have a +/−60° direction on the outer sides of the at least one vertical flange, the at least one inner flange, and the at least one outer flange;
   wherein the at least one outer flange includes a first bundle of first fibers, the first fibers being oriented in a direction that changes radially outward from the inner boundary where the first fibers are oriented in a +/−45° direction, to the outer boundary where the first fibers are oriented in a +/−60° direction;
   wherein the at least one outer flange includes a second bundle of second fibers, the second fibers being oriented in a direction that changes radially outward from the inner boundary where the second fibers are oriented in a +/−60° direction, to the outer boundary where the second fibers are oriented in a +/−70° direction.

2. The window frame of claim 1, wherein a direction of the fiber bundles follows the mechanical load direction.

3. The window frame of claim 2, wherein the direction of the fiber bundles arranged in the region of the outer flange are a quasi-isotropic, radial structure in a riveting region;

the direction of the fiber bundles arranged in the region of the inner flange is a 0° direction predominantly with +/−60° layers on the outer sides and 90° for reinforcement; and The direction for the fiber bundles arranged in the region of the vertical flange is a 0° core for receiving the main load and +/−60° layers on the outer side.

4. Window frame of claim 1,
wherein the unidirectional arranged fiber bundles of the inner flange and the outer flange comprise straight-laid fibers with a directions of 0°, +/−45°, and +/−60°.

* * * * *